United States Patent [19]

Burke

[11] 4,358,877

[45] Nov. 16, 1982

[54] BUCKLES FOR VEHICLE SEAT BELT SYSTEM

[75] Inventor: David Burke, Carlisle, England

[73] Assignee: Kangol Magnet Limited, Cumbria, England

[21] Appl. No.: 69,983

[22] Filed: Aug. 27, 1979

[30] Foreign Application Priority Data

Oct. 12, 1978 [GB] United Kingdom ............ 40348/78
Nov. 1, 1978 [GB] United Kingdom ............ 42716/78

[51] Int. Cl.³ .............................................. A44B 11/26
[52] U.S. Cl. ................................. 24/230 A; 24/230 AP
[58] Field of Search ........... 24/230 A, 230 AP, 230 TC

[56] References Cited

U.S. PATENT DOCUMENTS 3,481,009 12/1969 Preston et al. ................... 24/230 A
3,895,196 7/1975 Lewis ................................. 24/230 A
4,136,425 1/1979 Esner .................................. 24/230 A

*Primary Examiner*—Alexander Grosz
*Attorney, Agent, or Firm*—Young & Thompson

[57] ABSTRACT

A vehicle seat belt buckle has a socket part with a socket and a latch member for latching a tongue part within the socket. The latch member is held in the latching position by a catch element movable manually to release the latch member by means of a push button to which the catch element is connected either directly or by a lost motion connection. The latch member then rotates to a release position for the tongue under a spring bias, a portion of the latch member positively ejecting the tongue.

Instead, the latch member is rotated by the tongue to a release position in which the catch element applies a holding bias overcome by the tongue on reinsertion. In a third arrangement, the catch element is rolled against bias on a profiled surface of the latch member to tilt this to a release position in which it is held by an ejector until the tongue is reinserted.

21 Claims, 8 Drawing Figures

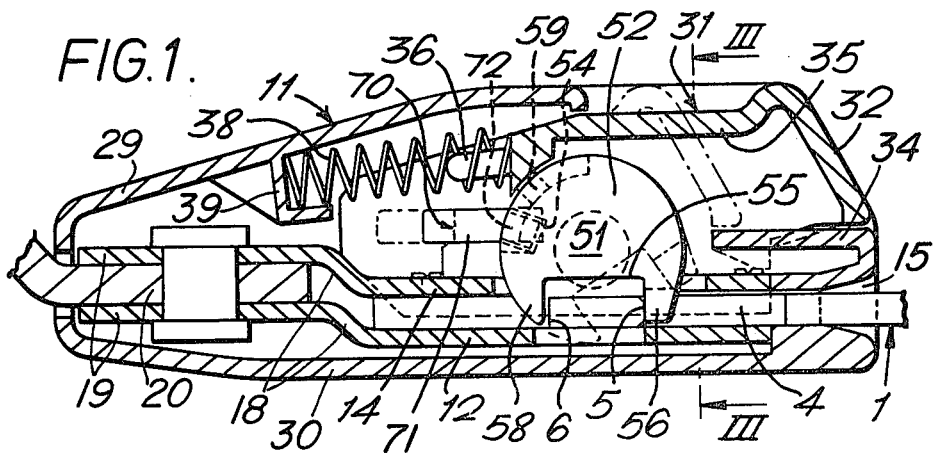
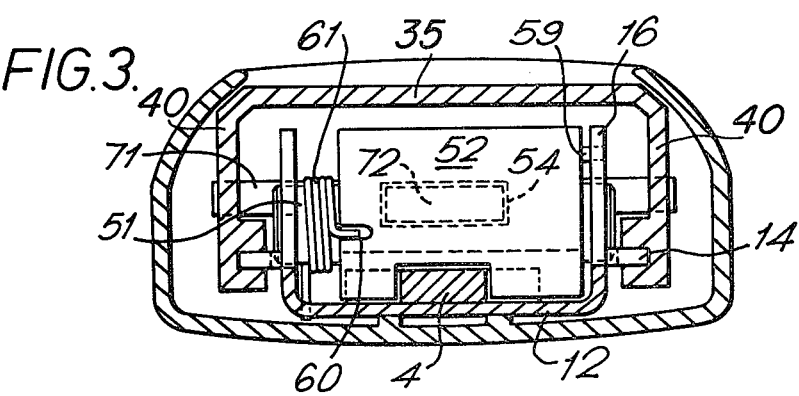
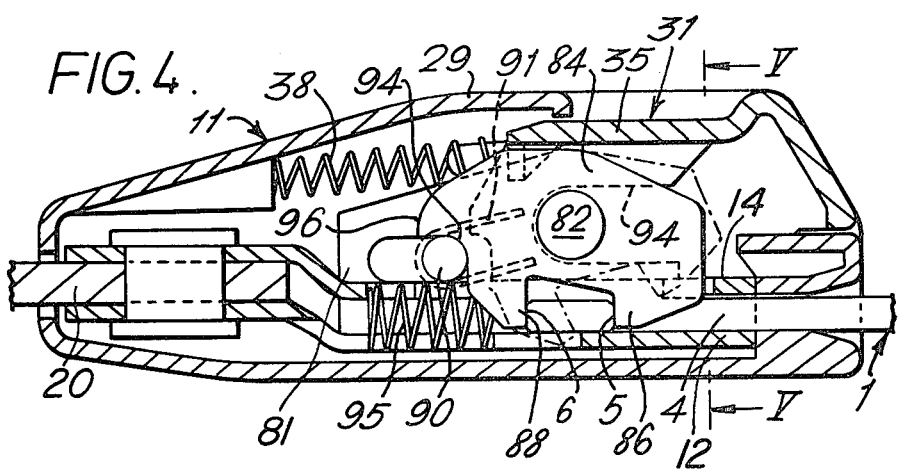

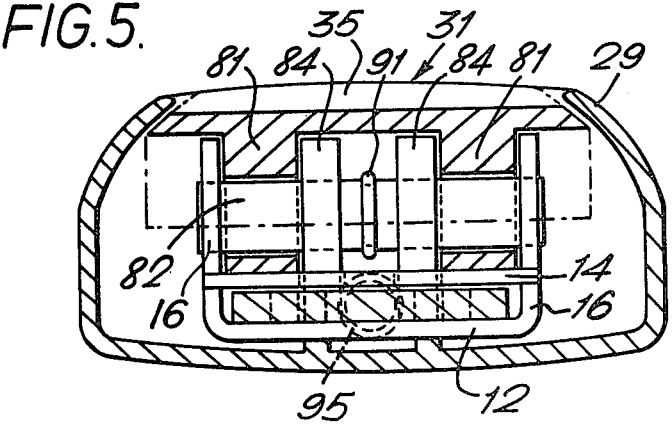
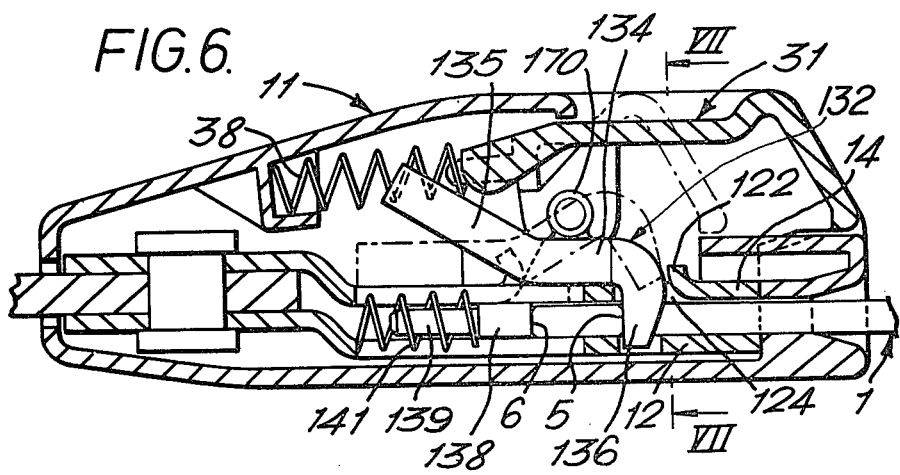
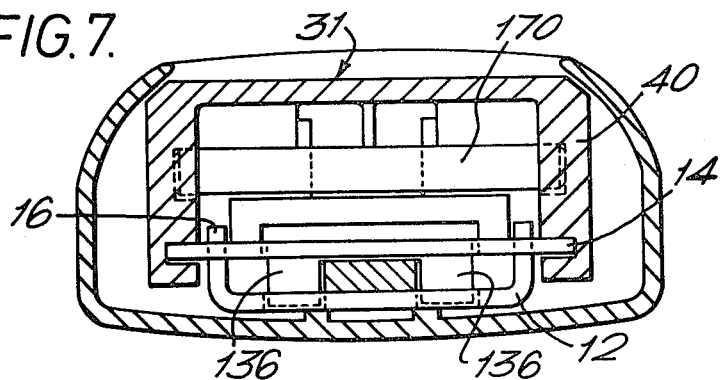

BUCKLES FOR VEHICLE SEAT BELT SYSTEM

BACKGROUND OF THE INVENTION

The invention relates to buckles of a kind suitable for use in a vehicle seat belt system.

Such buckles conventionally comprise a tongue part and a socket part, the tongue part having a tongue with a latch formation, and the socket part having a socket within which the tongue can be releasably latched by a latch mechanism having a latch member engageable with the latch formation.

Buckles of this kind require the tongue, on insertion into the socket, to engage the latch member to move this out of the path of the tongue to a position from which the latch member returns under spring pressure to latch the tongue in place; the tongue consequently experiences considerable resistance to insertion, and undesirable lateral loading. In some instances therefore the latch members engage the tongue so as to oppose withdrawal with only limited strength. The latch members can in some instances be displayed to release the tongue by inertial forces experienced when the buckle undergoes a sharp deceleration, as during an accident.

It is accordingly an object of the invention to provide a tongue and socket buckle with a latching member which is held in the latching position thereof by a manually releasable catch element. It is a further object of the invention to provide a tongue and socket buckle with a latching member adapted to function also as an ejector member.

It is another object of the invention to provide a tongue and socket buckle in which a catch element is arranged to positively maintain a latch member in the latching position and to resist movement of the latch member to the latching position due to insertion of the tongue into the socket.

It is also an object of the invention to provide a tongue and socket buckle in which the socket latch member is retained in a non-latching position when the tongue is absent from the socket.

It is also an object of the invention to provide a tongue and socket buckle in which insertion of the tongue into the socket is resisted only by the force of an ejector spring for facilitating removal of the tongue on release of the buckle.

It is a further object of the invention to provide a tongue and socket buckle in which the energy needed to move the latch member to the locking position on insertion of the tongue is obtained from the previous release of the tongue from the socket.

SUMMARY OF THE INVENTION

The invention provides a vehicle seat belt buckle with a tongue receivable in a socket for retention therein by a latch member, the buckle having a catch element adapted to hold the latch member in a latching position to prevent withdrawal of the tongue from the socket, the catch element being manually movable to permit movement of the latch member to a tongue release position.

The latch member can be arranged to move to a non-latching position, on disengagement of the catch element, under a spring bias, and where the latch member is retained in a non-latching position when the tongue is absent from the socket, it can be so retained by this bias. The latch member can then be provided with an ejector portion engageable by the tongue on insertion into the socket to move the latch member to the latching position against the bias, which subsequently acts as an ejector spring causing positive ejection of the tongue when the buckle is released.

The invention thus provides a buckle in which the latch member is spring biassed to function also as an ejector member.

The latch member can instead be releasably retained in a non-latching position after release of the tongue by engagement of the latch member by the catch element under a spring bias, this engagement being releasable on entry of the tongue into the socket, on which the latch member returns to the latching position and is firmly held therein by the first mentioned engagement of the catch element.

In a third structurally convenient arrangement, the latch member is held in a non-latching position by a separate ejector member which is arranged to assume a position, in the absence of the tongue from the socket, which blocks the latch member from moving to the latching position, to which it may be movable by the catch member on entry of the tongue under a spring bias.

The release of the latch mechanism is advantageously effected by means of a release member separate from the latch member but manually operable to effect disengagement of the latch release movement or the catch element from the latch member. The release member can take the form of a push button slidable parallel to the direction of movement of the tongue against a return spring. The release member can be fixedly connected to the catch element and where this is retained out of its holding position when the tongue is absent from the socket, the release member is held in the operated position also. The release member can instead be allowed to return to its inoperative position by providing a suitable lost motion connection between it and the catch element.

Other objects, features and advantages of the present invention will be apparent to those skilled in the art from the following, detailed description of illustrative embodiments thereof, taken in conjunction with the accompanying drawings, in which:

FIG. 1 is a sectional side view of a first illustrated buckle embodying the invention;

FIG. 3 is a sectional front view of the buckle of FIG. 1 taken on the line III—III of FIG. 1;

FIG. 4 is a sectional side view of a second buckle embodying the invention;

FIG. 5 is a sectional front view of the buckle of FIG. 4 taken on the line V—V of FIG. 4;

FIG. 6 is a sectional side view of a third buckle embodying the invention;

FIG. 7 is a sectional front view of the buckle of FIG. 6 taken on the line VII—VII of FIG. 6.

Figure 2:
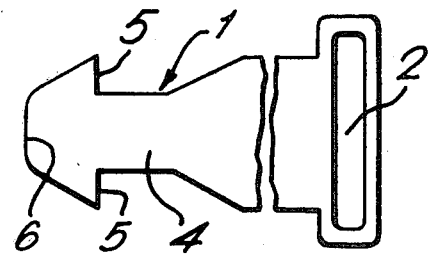
FIG. 2 is a plan view of the tongue part of the buckle of FIG. 1.

In the following description, directional terms such as "inwardly" and "rearwardly" refer to the direction of movement of the tongue part on insertion into the socket part of the buckle. Terms such as "upper" and "lower" refer to the illustrated buckles as they appear in the drawings. These terms are employed for convenience of description only, as the buckles of the invention can be employed in any orientation, and in seat belt systems of any configuration.

The buckle illustrated in FIGS. 1 to 3 comprises a tongue part 1 and a socket part 11. As best seen from FIG. 2, the tongue part 1 is a flat elongate metal plate having at one end a transverse aperture 2 by which it can be connected to the belt of a vehicle seat belt system. From this end extends a tongue which tapers to a narrow neck 4 from which it broadens out on either side by means of transverse edges 5 which constitute latch formations by which the tongue can be retained in the socket of the socket part 11. Finally the tongue part convertes to a rounded nose 6.

The socket part 11 comprises a lower metal plate 12 and an upper metal plate 14 held in spaced parallel relationship to define between them a socket with an open end or mouth 15 through which the tongue of the tongue part 1 can be inserted into the socket and withdrawn from it. The upper and lower socket plates are held together by upwardly extending side portions 16 of the lower plate 12 by which this is keyed to the upper plate 14. The socket plates extend rearwardly from the mouth 15 beyond the socket, through double bend portions 18 to securement end portions 19 where they receive betweem them a metal bracket 20 which extends further rearwardly to provide a means whereby the socket part 11 can be anchored to a vehicle, as by a bolt extending through an aperture in the bracket 20. The securement end portions of the upper and lower plates 12,14 are held together by a rivet or other suitable fastening means extending through aligned apertures in them and in the bracket 20. The socket part can be readily modified for securement to a vehicle mounting position by means other than a metal bracket, for example, a "dead" or a resilient cable or a short portion of belt.

The upper and lower plates 12,14 are fixedly received in a housing comprising upper and lower housing parts 29,30 moulded in plastics material and welded together. The housing parts are shaped to co-operate with the forward end of the socket plates to define the mouth 15 of the socket, and the upper housing part 29 has an opening extending rearwardly from the forward end of the upper socket plate. This opening accommodates a push or release button 31 which can be slid manually in the rearward direction to effect release of the tongue from the socket. The release button comprises a front wall 32 which inclines rearwardly and upwardly from the socket mouth. The free end of the wall 32 slides along an upwardly and rearwardly turned portion 34 of the upper housing part 29. A top wall 35 extends rearwardly from the front wall 32 to beneath the transverse edge of the opening in the upper housing part 29. The inclination of the front wall 32 of the release button minimises the risk of inadvertent actuation of the button to cause the tongue to be released from the socket.

Beneath the upper housing part 29, the release button 31 is provided with a rearwardly projecting stub 36 received in one end of a compression return spring 38 having its other end received in a pocket 39 formed on the inner side of the upper housing wall. The spring 38 thus acts between the release button 31 and the upper housing part 29 to urge the release button to the position shown which is defined by suitable stop means (not shown).

Side walls 40 extend downwardly from the top wall 35 and rearwardly from the front wall 32. Along the lower edges of the side walls 40, slots extend in thickened internally projecting portions of the walls, into which the free edges of the upper plate 14 are slidably received to guide the button 31 for movement parallel to the movement of the tongue in the socket.

The side portions 16 of the lower plate 12 extend upwardly beyond the upper plate 14 and receive in apertures therein a rod 51 which rotatably carries a spool member 52 which functions both as a latch member to hold the tongue of the tongue part 1 in the socket between the plates 12,14 and as an ejector member. The spool member 52 has a generally cylindrical external surface but is provided with axially extending slots 54,55 facing respectively generally rearwardly and downwardly. The lower slot 55 extends to the axial aperture of the spool member by which it is mounted on the rod 51 and is defined by forward and rear ridges 56,58 of which the forward ridge 56 is divided by a central gap. Both ridges 56,58 extend through an aperture in the upper plate 14 into the socket in the locking position shown, but rotation of the spool member in the anticlockwise direction brings the forward ridge 56 clear of the socket.

A stop 59 extends axially from one end wall of the spool member 52 at a position spaced from its axis, and co-operates with a slot formed in the adjacent side wall 16 so as to limit the angle through which the spool member can rotate. At its other end, the spool member has an axially extending hole 60 closely adjacent the rod 51 which receives one end of a torsion spring 61 coiled around the rod; the other end of this spring extends through the aperture in the upper plate 14 and is received in a circular aperture in the lower plate. The spring 61 tends to rotate the spool member 52 anticlockwise from the position shown in FIG. 1.

A generally rectangular catch element 70 has projecting end portions 71 fixedly received in apertures in the side walls 40 of the button 31 so as to extend transversely across and above the upper plate 14. A central catch portion 72 extending forwardly from the catch element is inclined downwardly at about 15° for reception in the rearwardly facing slot 54 of the spool member 52. The catch element 70 and the spring 38 acting on it through the button 31 constitute a catch mechanism for the spool member 52.

In the illustrated position of the buckle, the tongue is fully received in the socket and is held therein against withdrawal by engagement of the edges 5 against the ridge 56, the neck 4 being received between the two parts of this ridge. This position is maintained against withdrawal forces acting on the tongue part 1, which will tend to rotate the spool member 52 anti-clockwise, by the reception of the catch portion 72 of the catch element 70 in the rear slot 54 of the spool member. The catch element 70 is held in this position by the button 31, undesired inward movement of which is resisted by the spring 38. The withdrawal forces are applied by the edges 5, through the spool member 52, to the lower plate 12, and thus to the mounting bracket 20. To a certain extent, such forces are applied through the catch element 70, which bears on an upper edge 19 of the side portion 16 of the lower plate 12.

When the tongue part 1 is to be released, the button 31 is moved inwardly, to free the catch element 70 from engagement with the spool member 52; the latter then rotates anti-clockwise because of the torsion spring 16. The forward ridge 56 of the spool member 52 thus disengages from the latch edges 5 and moves out of the socket. The rear ridge 58 acts on the inner side of the tongue to positively eject this from the socket. The stop 59 engages the side portion 16 so as to limit anti-clockwise rotation of the spool member 52. The button 31 cannot return to the forward position shown because the catch portion 72 engages an unslotted part of the periphery of the spool member.

When the buckle is to be refastened, the tongue is inserted in the socket. The forward ridge 56 of the spool member 52 is at this time clear of the socket, and the nose 6 engages against the rear ridge 58 to cause the spool member to rotate clockwise, so bringing the forward ridge into latching engagement with the latch edges 5 of the tongue. The catch portion 72 of the catch element 70 now enters the rear slot 54 in the spool member, the push button 31 moving forwardly with it, under the bias of the return spring 38. The buckle has thus been restored to the latching position illustrated.

The inclination of the catch portion 72 to the direction of movement of the catch member causes initial anticlockwise rotation of the spool member 52 as the latch member is withdrawn. This inclination can be selected to provide a predetermined release load.

In a modification, the catch member 70 is slidably received in slots in the side walls 40, so that there is a lost motion connection between the member and the button 31, and biassed forward by a separate spring, the button then being free to move forward to the position shown even though the spool member is in its release position.

The two other buckles illustrated and yet to be described all have a tongue part corresponding to the tongue part 1 of FIG. 2 and socket parts including lower and upper plates, housing parts and a release button corresponding generally to those of the socket part of FIGS. 1 and 3. These components are identified in the remaining drawings by the reference numerals used in FIGS. 1 and 3 and their nature and function are described below only so far as the differences between the three other buckles and that of FIGS. 1 to 3 makes this necessary. In particular, the plates 12,14 will be provided with apertures which are differently shaped in each buckle for co-operation with the other parts thereof, which aperture shapes will not in general be specifically described as they can be readily deduced from the drawings and description.

In the second buckle embodying the invention, shown in FIGS. 4 and 5, the push or release button 31 slides along the upper edges of the side portions 16 of the lower plate 12. The push button top wall 35 has downwardly extending guide portions 81 sliding on the inner surface of the side portions 16 and its upper surface is guided by the overlapping edges of the side walls of the upper housing part 29.

Above the upper plate 14, the side portions 16 of the lower wall 12 have transversely aligned apertures journalling a pivot pin 82 carrying a spaced pair of latch plates 84, which together constitute a latch member. Each plate 84 has transverse forward and rear teeth 86 and 88 both of which extend through apertures in the upper plate 14 floor into the socket in the latching position shown so that the teeth 86 can function as latch portions. Rearwardly of the apertures, the side portions 16 have transversely aligned longitudinally extending slots in which is received a transversely extending catch element in the form of a bar or rod 90. A spring 91 extending around the catch bar 90 and the pivot pin 82 acts to pull these together, so that the catch bar tends to occupy the forward end of the slots in which position it is received in downwardly and rearwardly facing recesses 94 in the plates 84 so as to prevent anticlockwise rotation of these.

The downwardly extending guide portions 81 of the push button top wall 35 have elongate recesses 94 opening from their forward edges to accommodate the pivot pin 81 and enable the push button 31 to move rearwardly, and at the lower rear corners, the guide portions have rearwardly and downwardly facing recesses 96 corresponding generally in shape to the recesses 94 in the plates 84.

In the latching position shown, the tongue is received in the socket and withdrawal forces acting on the tongue part 1 cannot rotate the latch plates 84 anticlockwise because of the latch bar 90. The withdrawal forces are applied through the plates 84 and the pivot pin 82 to the upper and lower plates 12,14 and thus to the connection of the socket part to the vehicle. An ejector spring 95 retained in central longitudinally extending slots in the socket plates may be provided to abut the nose 6 of the tongue so that the spring is held in a compressed condition.

To effect release of the tongue from the socket and thus separation of the two buckle parts, the push button 31 is manually pushed rearwardly. The recesses in the guide portions 81 engage the latch bar 90 and move it rearwardly in the slots. This frees the retainer plates 84 for anti-clockwise rotation which takes place because the tongue is withdrawn manually and/or ejected by the spring 95 and effects the rotation by a camming action on the teeth 86. The plates 84 thus turn to the position shown in broken line in which the forward teeth 86 are clear of the socket and the rear teeth 88 are received in an aperture in the lower plate 12.

Following separation of the buckle parts and removal of manual pressure on the push button 31, this moves forward to the position shown because of the spring 38, independently of the bar 90. The bar is pulled forward by the spring 91 but engages peripheral portions 96 of the plates 84 above the recesses 94 which are profiled so that clockwise return rotation of the plates is prevented.

Re-connection of the buckle parts occurs when the nose 6 of the tongue cams the latch plates 84 clockwise by engaging the rear teeth 88. The bar 90 rides over the peripheral portions 96 and then moves forwardly into the recesses 94 to prevent return rotation of the plates 84 until the button 31 is again pushed in.

In a modification, the latch bar 90 is fixedly carried by the button 31 so that the latter is held in the release position when the buckle parts are separated. The spring 95 is then omitted, as the bar 90 is then urged into the latching position by the spring 38.

The third buckle embodying the invention shown in FIGS. 6 and 7 has a socket part of which the side portions 16 of the lower plate 12 serve only for securement of the upper wall 14. The push button 31 slides along the side edges of the upper plate 14.

The button 31 carries a catch element 170 in the form of a transversely extending roller rotatably journalled at its ends in the push button side walls 40. A latch member 132 has a profiled upper surface provided by a central plate-like portion 134 which lies directly on the upper plate 14 in the position illustrated, and a plate-like rear portion 135 which extends rearwardly and upwardly from central portion. Transversely spaced latch portions 136 extend downwardly from the front edge of the central portion 134 through apertures in the socket plates 12,14 into the socket for latching engagement with the edges 5 of the tongue.

The latch member 132 is held in the latching position shown by the catch roller 170 which overlies its central portion 134.

An ejector member 138 is slidably received in the socket and is guided by portions received in slots in the plates 12,14 for movement toward the socket mouth under the bias of a compression spring 141 received between the rear ends of apertures in the sockets and rearwardly extending pin 139 of the ejector member. In the position shown, the forward edge of the ejector member engages the nose 6 of the tongue.

Release of the tongue from the socket is effected by manual rearward movement of the button 31 against the bias of the return spring 38. The catch roller 170, carried rearwardly by the button, attempts to ride up the rear portion 135 of the latch member and consequently the latter is pivoted anticlockwise, the latch portions 136 being lifted clear of the socket. The underneath join of the portions 134,135 is curved to make this tilting of the latch member a smooth rolling movement. The ejector member 138 then moves the tongue out of the socket and reaches a forward position, determined by the engagement of the guide portions of the ejector member with the forward ends of the guide slots in the plates 12,14, in which the upper surface of the ejector member underlies the upper plate aperture 124 through which the latch portions 136 have been lifted. The retainer member 132 and the push-button 31 are thus held in the release position. The spring 38 urges the push-button forwardly and upwardly lifted central portion 134 because the engagement of the latch portions 136 on the ejector member prevents clockwise tilting.

Re-insertion of the tongue into the socket pushes the ejector member 138 rearwardly so that when the aperture 124 is cleared, the catch roller 170 can act on the latch member to restore the latching position shown. Withdrawal forces acting on the tongue are applied from the latch edges 5 to the latch portions 136 and are taken up by the plates 12,14 at the forward edges of the apertures therein, the latter edge of the plate 14 being formed by an upwardly rolled portion 122.

In a modification, the catch roller 170 is guided in slots in the push button side walls 40 extending in the direction of movement of the button and permitting the button to return to the illustrated position when the tongue is absent from the socket. Additional spring means acts on the roller 170 to urge this forward in the slots so that the roller can tilt the latch member clockwise on insertion of the tongue when this becomes possible, because the tongue edges 5 have passed beyond the aperture 124.

Figure 8:
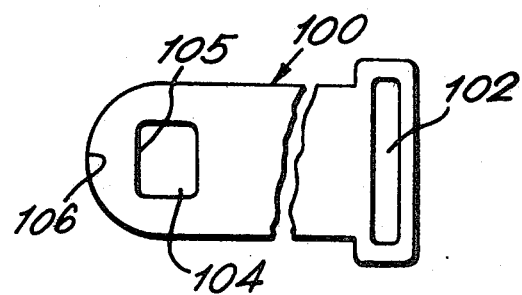
FIG. 8 is a plan view of an alternative form of tongue part which can be used with suitably modified versions of the socket parts of the buckles illustrated.

The invention can be embodied in a variety of ways other than as specifically described. For example as shown in FIG. 8, a modified tongue part 100 can comprise a flat metal plate with a different kind of latch formation from that of the tongue 1 of FIG. 2. The modified tongue part 100 again has a belt connection aperture 102 at one end and a rounded nose 106 at the other, but only a single latching edge 105 is provided, by means of a central aperture 104 in the tongue. It will be evident that the socket parts of the buckle illustrated in FIGS. 1 to 7 can be readily modified to receive this tongue part 100, by providing the latch member with a single central latch portion instead of two transversely spaced latch portions.

The invention has been particularly shown and described with reference to particular embodiments thereof, but it will be understood by those skilled in the art that various changes and modifications may be made therein without departing from the spirit and scope of the invention.

I claim:

1. A buckle for use in a vehicle seat belt system comprising tongue means and cooperating socket means:
    said tongue means comprising a tongue and latch formation means on said tongue; and
    said socket means having means providing a socket adapted to receive said tongue therein;
    latch means having a latching position in which said latch means engages said latch formation means when said tongue is in said socket to thereby latch said tongue means and said socket means together, said latch means being movable from said latching position to a release position in which said tongue can leave said socket;
    catch means having a catch position in which said catch means engages said latch means to hold said latch means in said latching position and movable from said catch position in a direction substantially parallel to said direction of movement of said tongue to free said latch means for movement to said release position;
    release means manually movable to effect movement of said catch means from said catch position to free said latch means; and
    means mounting said latch means, said catch means and said release means on said socket means with said catch means located intermediate said release means and said socket.

2. The buckle of claim 1 further comprising holding means adapted to hold said latch means out of said latching position on said operation of said release means and to restore said latch means to said latching position in response to insertion of said tongue into said socket.

3. The buckle of claim 2 wherein said latch means comprises a rotatably mounted spool member, a recess is provided in said spool member and a catch portion of said catch means is engageable in said recess.

4. The buckle of claim 3 wherein said catch portion is inclined to the direction of movement of said catch means so as to tend to turn said spool member from the latching position thereof on withdrawal of said catch portion from said recess.

5. The buckle of claim 1 further comprising a portion on said latch means adapted to be engaged by said tongue on insertion into the socket to thereby move the latching means into the latching position thereof.

6. The buckle of claim 5 further comprising spring means biassing said latch means to cause said portion thereof to function as an ejector means to urge said tongue out of said socket.

7. The buckle of claim 1 wherein said release means comprises push button means movable substantially parallel to said direction of movement of said tongue.

8. The buckle of claim 7 wherein said catch means is fixedly connected to said push button.

9. The buckle of claim 7 further comprising lost motion means between said catch means and said button, and spring means adapted to oppose said movement of said push button.

10. The buckle of claim 7 wherein the tongue comprises a flat plate, said means providing said socket comprises two parallel plate members, means for connecting the socket part to a vehicle is secured to said plate members, and one of said plate members slidably guides said push button.

11. The buckle of claim 1 having means mounting said latch means for pivotation from said latching position about an axis transverse to said direction of movement of said tongue, an engagement formation on said latch means, a catch portion on said catch means engageable with said formation, said catch portion and said formation being cooperatively shaped so that said movement of said catch means turns said latch means from said latching position.

12. The buckle of claim 1 further comprising spring means biassing said latch means to move from said latching position and an abutment portion on said latch means adapted to be abutted by said tongue on entry into said socket to thereby restore said latch means to said latching position thereof.

13. The buckle of claim 1 further comprising spring means biassing said catch means to engage said latch means and wherein said catch means is adapted to slidingly engage said latch means during movement to the latch means to the latching position thereof, whereby said movement is opposed by said spring means bias.

14. The buckle of claim 13 further comprising a shaft on which said latch means turns to and from said latching position, said spring means acting between said shaft and said catch means.

15. The buckle of claim 1 comprising ejector means adapted to urge said tongue out of said socket, and wherein said tongue is adapted to engage said latch means on movement of said tongue out of said socket to move said latch means out of said latching position.

16. The buckle of claim 15 wherein said catch means is spring biassed to engage said latch means, and said latch means has a detent formation engageable by said catch means when said latch means is moved from said latching position, said engagement resisting but not preventing restoration of said latch means to said latching position on re-insertion of said tongue.

17. The buckle of claim 1 wherein said latch means has first and second relatively inclined surfaces, and said catch means is movable from a position in which it engages the first surface to a position in which it engages the second surface thereby rocking the latch means from the latching position.

18. The buckle of claim 17 wherein said first and second surfaces are continuous and said catch means comprises roller means rollable on said surfaces.

19. The buckle of claim 18 wherein said socket defining means includes a wall portion and said latch means comprises two adjoining flat plate portions providing said surfaces and having therebetween on the side opposite said surfaces a curved edge for rolling on said wall portion.

20. The buckle of claim 17 wherein said catch means is spring urged to said release position thereof and further comprising spring urged ejector means slidable within said socket and adapted to oppose insertion of said tongue, said ejector means preventing movement of said latch means to said latching position in absence of the tongue from said socket.

21. The buckle of claim 17 wherein said release means comprises push button means manually slidable in said direction of movement of said tongue and means coupling said push button means to said catch means.

* * * * *